United States Patent
Tanimura et al.

[11] Patent Number: 5,890,142
[45] Date of Patent: Mar. 30, 1999

[54] APPARATUS FOR MONITORING SYSTEM CONDITION

[75] Inventors: Takayoshi Tanimura, Tokyo; Tadashi Iokibe, Mishima; Yasunari Fujimoto, Tokyo, all of Japan

[73] Assignee: Kabushiki Kaisha Meidensha, Tokyo, Japan

[21] Appl. No.: 599,591

[22] Filed: Feb. 9, 1996

[30] Foreign Application Priority Data

Feb. 10, 1995 [JP] Japan .................................. 7-022456

[51] Int. Cl.$^6$ ........................... G06F 15/18; G05B 13/02
[52] U.S. Cl. ................................... 706/12; 395/184.01
[58] Field of Search ................................ 395/10, 50, 21, 395/22, 23, 184.01; 706/23, 12

[56] References Cited

U.S. PATENT DOCUMENTS

| | | | |
|---|---|---|---|
| 5,140,670 | 8/1992 | Chua et al. | 706/29 |
| 5,253,329 | 10/1993 | Villarreal et al. | 706/31 |
| 5,371,669 | 12/1994 | Venkataraman et al. | 364/160 |
| 5,404,298 | 4/1995 | Wang et al. | 706/10 |
| 5,442,510 | 8/1995 | Schwartz et al. | 364/152 |
| 5,453,940 | 9/1995 | Broomhead et al. | 706/12 |
| 5,506,996 | 4/1996 | Wang et al. | 395/800.36 |
| 5,510,976 | 4/1996 | Tanaka et al. | 364/148.09 |
| 5,617,513 | 4/1997 | Schnitta | 706/14 |
| 5,645,069 | 7/1997 | Lee | 600/518 |

FOREIGN PATENT DOCUMENTS 92 16897  10/1992  WIPO .......................... G06F 15/18

OTHER PUBLICATIONS

L.A. Smith, et al., "A New Technique for Fault Detection in Multi–sensor Probes," Int'l. Conf. on Control '91, vol. 2, pp. 1062–1067, Mar. 1991.

G. Morgavi, et al., "Chaotic Signals: Attractor Reconstruction and Local Prediction," Proc. 34th Midwest Symposium on Circuits and Systems, vol. 1, pp. 48–51, May 1991.

*Primary Examiner*—Robert W. Downs
*Attorney, Agent, or Firm*—Foley & Larder

[57] ABSTRACT

A monitoring apparatus for monitoring an operating condition of a system includes a predicting section which generates a data vector whose parameter is determined by a timeseries data of the system and which obtains a prediction value of the timeseries data of a predetermined time future by means of the chaotic inference based on a behavior of attractor which is generated in a reconstruction space by an embedding operation of the data vector. A monitoring section compares the detected value and the prediction value of the timeseries data and decides the condition of the observed system according to the compared result. Therefore, it becomes possible to appropriately and quickly judge as to whether the observed system is in an abnormal condition or not.

11 Claims, 3 Drawing Sheets

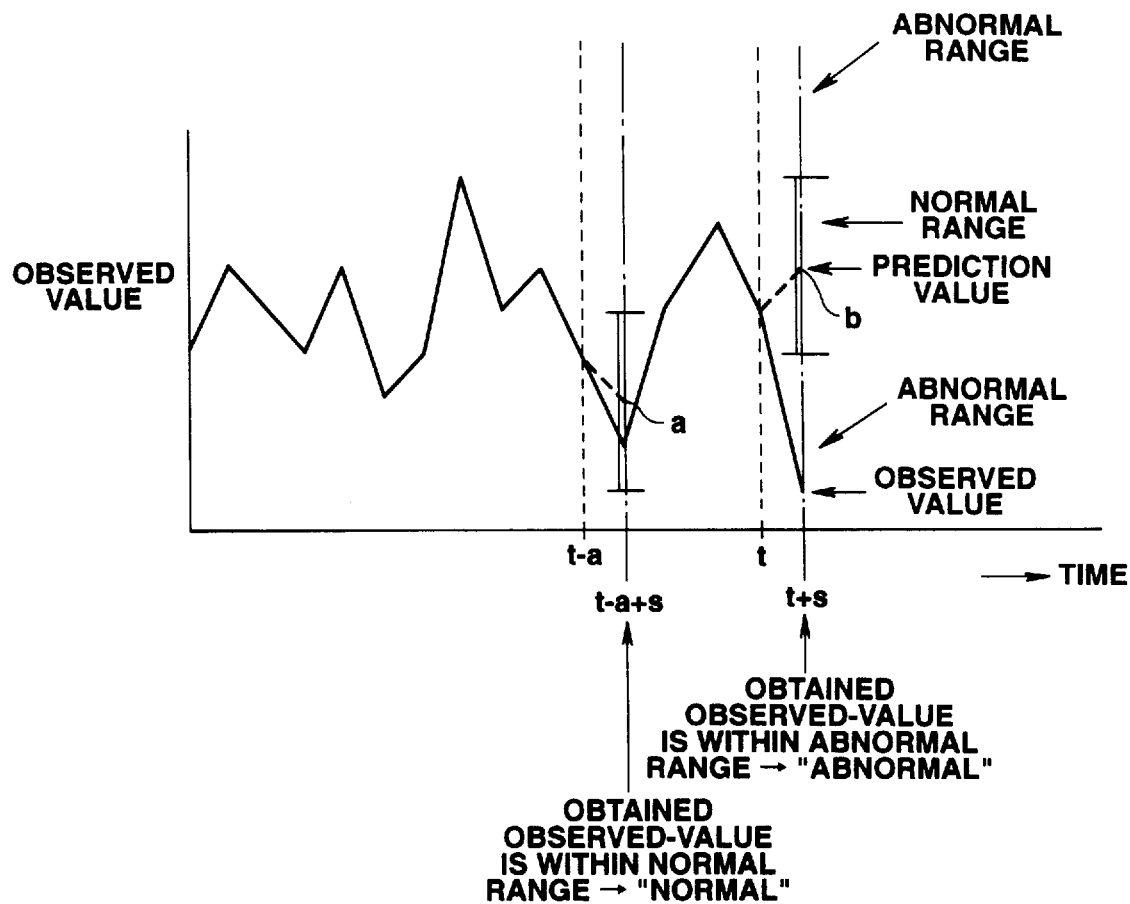
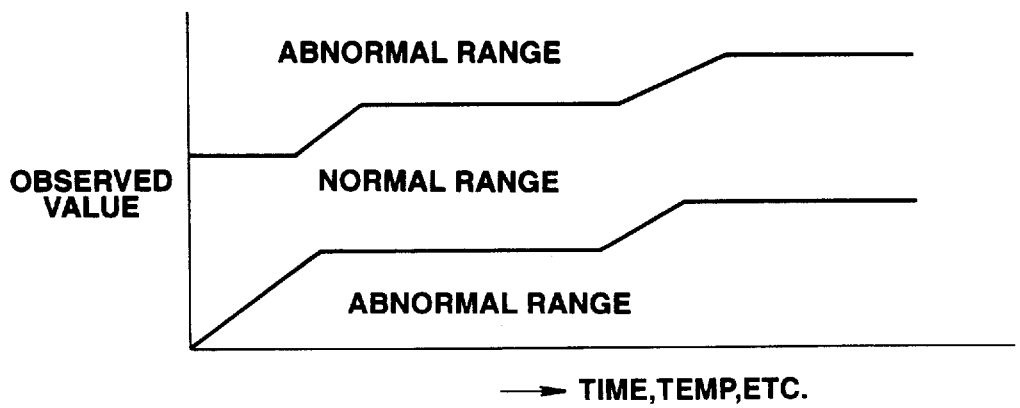

APPARATUS FOR MONITORING SYSTEM CONDITION

BACKGROUND OF THE INVENTION

1. Field of the Invention

The present invention relates to improvements in an apparatus for monitoring a system by utilizing the deterministic chaotic theory.

2. Description of the Prior Art

Conventionally, a monitoring technology for deciding abnormality of an object is required in various fields to accurately and quickly execute a decision as to whether the system to be monitored is operated in a normal condition or not. Normally, such decision is executed in a manner such that the decided condition is represented by parameters such as temperature, humidity and speed, and then it is decided that the monitored object is in an abnormal condition when one of these parameters takes a value out of an allowable value in several times or for a predetermined time period. Further, the decision of the abnormality is derived by using AI (artificial intelligence) or Fuzzy inference which employs an algorithm based on the experienced rules (rule of thumb) and stored data. In these technology, the decision of the abnormality is obtained by dividing the range into a normal range and an abnormal range on the basis of past data, for example, as shown in FIG. 3.

However, if an applied system is dynamic, it is difficult to accurately decide the normality or abnormality of the system. Although the normal range tends to be loosely set, the normal range is consequently treated as a fixed range. Accordingly, it is difficult to timely change the normal range and the abnormal range in response to the condition of the parameters. Further, since the normal range is loosely set (with a sufficient margin), it may happen that the abnormal condition exists in the range decided as a normal range. Furthermore, when the monitored system is transferring from a normal condition to an abnormal condition, the conventional monitoring apparatus merely outputs a decision that the monitored object is in a normal condition. Accordingly, it is impossible to decide as to whether the condition of the object is going from a normal condition to an abnormal condition or from an abnormal condition to a normal condition.

SUMMARY OF THE INVENTION

It is an object of the present invention to provide a monitoring apparatus which quickly and accurately decides as to whether a monitored object is in a normal condition or abnormal condition.

A monitoring apparatus according to the present invention is for monitoring an operating condition of a system. The monitoring apparatus comprises a data storage section which stores detected values of the timeseries data from the system. A predicting section generates a data vector whose parameter is determined by the timeseries data of the data storage section. The predicting section obtains a prediction value of the timeseries data of a predetermined time future by means of the chaotic inference based on a behavior of an attractor which is generated in a reconstruction space by an embedding operation of the data vector. A monitoring section compares the detected value and the prediction value of the timeseries data and decides the condition of the observed system according to the compared result.

With this arrangement, since the abnormality of the system is determined according to a normal range which is determined from a prediction value obtained by means of the chaotic short-term prediction method, it becomes possible to execute a decision of the abnormality according to the condition of the observation system.

BRIEF DESCRIPTION OF THE DRAWINGS

FIG. 2 is a graph showing a relationship between a prediction value and an observed value from a system by the monitoring apparatus of FIG. 1;

FIG. 3 is a graph which shows a normal range and an abnormal range of the observed value of a conventional monitoring apparatus;

DETAILED DESCRIPTION OF THE INVENTION

Figure 1:
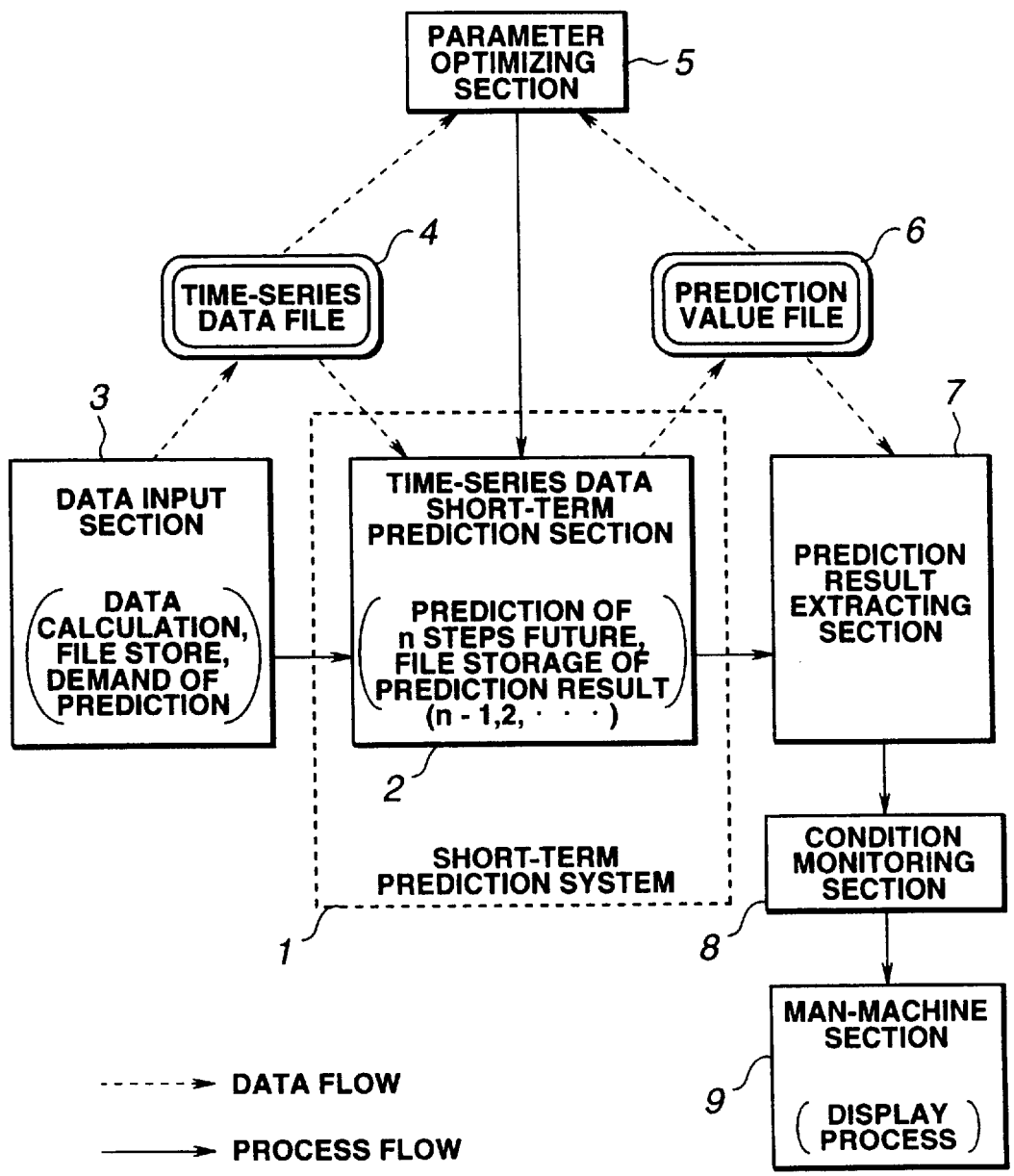
FIG. 1 is a block diagram of an embodiment of a monitoring apparatus according to the present invention.

Referring to FIGS. 1 to 2, there is shown an embodiment of an abnormality monitoring apparatus using a chaotic short-term prediction method in accordance with the present invention.

First, in order to facilitate understanding of this invention, the explanation of the deterministic chaos theory will be discussed hereinafter.

Nearly all non-periodic, complex and irregular phenomena were formally considered indeterministic phenomena subordinate to randomness. Yet, apparently irregular, unstable and complex behavior can often be generated from a differential or difference equation governed by determinism where the subsequent states are all determined in principle, if once the initial value is given. This is the deterministic chaos of dynamical system. Thus, the deterministic chaos is defined as a phenomenon which appears to be irregular, but is governed by a distinct determinism.

When the behavior of any timeseries data is chaotic, it can be assumed that the behavior follows a certain deterministic law. Then, if the nonlinear deterministic regularity can be estimated, data in the near future till the deterministic causality is lost can be predicted from the observed data at a certain time point because chaos has a "sharp dependency on initial condition". A prediction from the viewpoint of deterministic dynamical system is based on the embedding theory for "reconstructing the state space and the attractor of the original dynamical system from single observed timeseries data". The embedding theory is summarized below.

Figure 4:
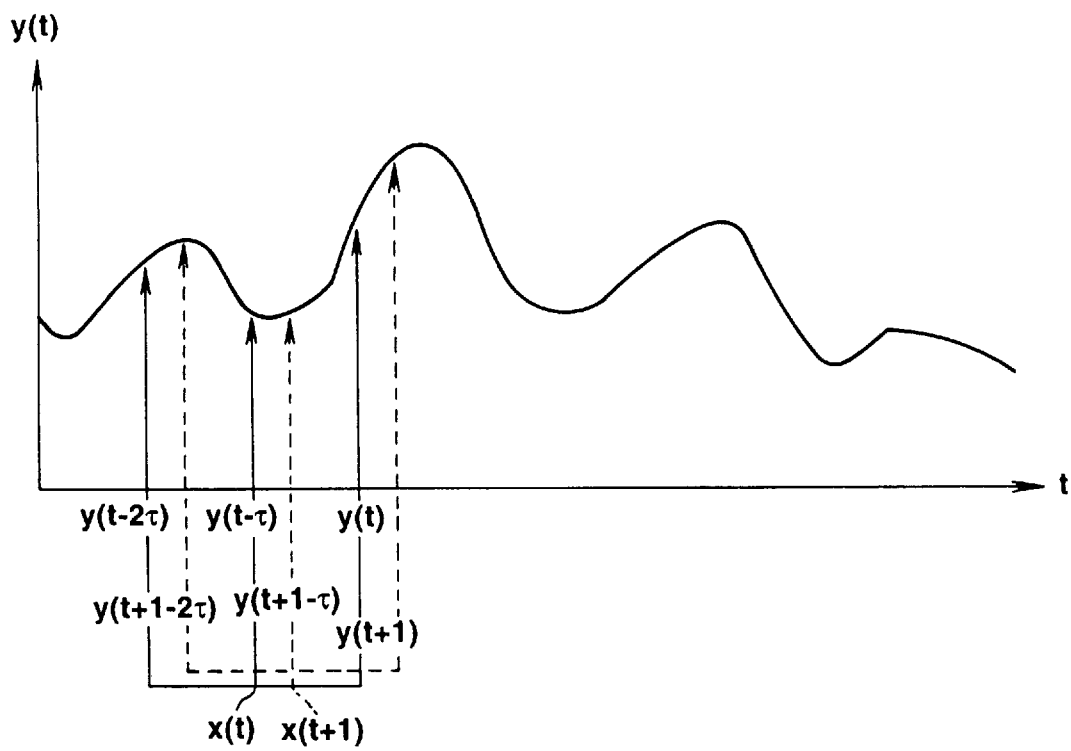
FIG. 4 is a graph showing timeseries data.

As shown in FIG. 4, from the observed timeseries data $y(t)$, a vector $x(t)$ is generated as follows.

$$x(t)=(y(t), y(t-\tau), y(t-2\tau), \ldots, y(t-(n-1)\tau))$$

where "$\tau$" represents a time delay.

Figure 5:
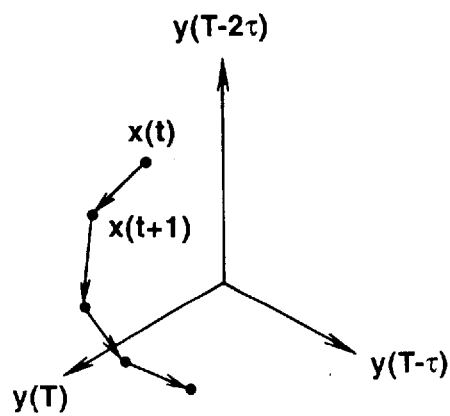
FIG. 5 is a view for explaining an attractor.

This vector indicates one point of an n-dimensional reconstructed state space $R^n$. Therefore, a trajectory can be drawn in the n-dimensional reconstructed state space by changing "t", for example, as shown in FIG. 5. Assuming that the target system is a deterministic dynamical system and that the observed timeseries data is obtained through an observation system corresponding to $C^1$ continuous mapping from the state space of dynamical system to the 1-dimensional Euclidean space R, the reconstructed trajectory is an embedding of the original trajectory when "n" value is sufficiently large.

Namely, if the observed timeseries data is derived from a first attractor of the original dynamic system, another attractor, which maintains the phase structure of the first attractor, will appear in the reconstructed state space. Accordingly, the vector x(t) moves on the attractor, and therefore, in short-term range, it becomes possible to predict the position of the vector x(t) of s-steps in the future, that is, x(t+s). The s-steps future vector x(t+s) is represented as follows.

$$x(t+s)=(y(t+s), y(t+s-\tau), y(t+s-2\tau), \text{- - -}, y(t+s-(n-1)\tau))$$

wherein y(t+s) which is a component of x(t+s) is timeseries data s-steps ahead from the observed point, and the value is a prediction value of s-steps in the future. Further, when s>τ, y(t+s-t) is also a prediction value.

Thus, according to the value of s, the prediction value of a predetermined steps in the future of the original timeseries data is obtained. Since the chaotic system has a "sharp dependency on initial value", this method is not preferable to be applied to a long term prediction. However, as to a near-future data until loses deterministic dependency, it is possible to accurately obtain the prediction value.

As shown in FIG. 1, the monitoring apparatus according to the present invention comprises a short-term prediction system section 1 which includes a timeseries data short-term predicting section 2 including a data file section (a timeseries data storing and predicting section), a data inputting section 3 including a sensor section, a prediction result extracting section 7, a condition monitoring section 8 and a man-machine section 9.

The data inputted from the data input section 3 is inputted to the timeseries data short-term predicting section 2 or the parameter optimizing section 5 through a timeseries data file 4. When the data is inputted to the parameter optimizing section 5, the parameter optimizing section 5 executes an optimizing process of the parameter of the data, and the data of the optimized parameter is inputted to the timeseries data short-term predicting section 2.

In the timeseries data short-term predicting section 2, the prediction of a s-steps in the future value is executed on the basis of the inputted data and the parameters. The prediction value is sent to a prediction value file 6, and is then inputted to the parameter optimizing section 5 and the prediction result extracting section 7. In the parameter optimizing section 5, the parameter is optimized on the basis of the prediction value from the prediction value file 5 and the input timeseries data from the data input section 3 through a timeseries data file 4. In the prediction result extracting section 7, the prediction result outputted from the prediction value file 6 is inputted to the condition monitoring section 8. In the condition monitoring section 8, the prediction value and the actual value are compared with each other, and it is decided according to the predetermined reference as to whether the abnormal condition is caused or not. The decision at the condition monitoring section 8 is inputted to the man-machine section 9, wherein the decision result is displayed.

Hereinafter, the manner of operation of the short-term prediction system section 1 will be discussed.

First, timeseries data y(t), y(t-τ), y(t-2τ) - - - , (wherein τ is a time delay) is inputted through the timeseries data file 4 from the data inputting section 3 to the timeseries data short-term predicting section 2. In the timeseries data short-term predicting section 2, n-dimension reconstruction condition space $R^n$ is reconstructed, and a prediction value of s-steps in the future is obtained by reconstructing the attractor of the observed system. Further, the prediction value of s-steps in the future is compared with the actually observed value. As shown in FIG. 2, when the decision as to whether the system is abnormal or normal is executed, upper and lower values of the data are set on the basis of the prediction value, a range between the upper and lower values is defined as a normal range where the observed system is normal, and the other range is defined as an abnormal range.

For example, when at a time (t-a) a prediction value of the s-steps in the future is obtained, the prediction value is shown by a point a of FIG. 2 and the normal range determined from the point a is designated by a continuous line part at the time (t-a+s). Since the actually observed value at the time (t-a+s) is within a normal range, it is judged that the observed value at this point (t-a+s) is in a normal condition.

Also, the prediction value of the s-steps in the future, which value is obtained at the time t, is designated by a point b in FIG. 2, and the normal range determined from the point b is designated by a continuous line part at the time (t+s). Since the actually observed value at the time (t+s) is within an abnormal range, it is judged that the observed value at this point (t+s) is in an abnormal condition.

In the timeseries data short-term predicting section 2, the strange attractor is reconstructed by embedding the timeseries date in a normal condition and the embedded parameters are stored.

In case that a disturbance of the system has occurred, the prediction error, which corresponds to a difference between the prediction value and the actually detected value of the timeseries data, becomes large. When the prediction error becomes larger than a preset threshold value, the parameter optimizing section 5 executes an optimization of the parameters. By checking the change of "delay" of the obtained parameter, it is possible to know that the system is going to "abnormal condition". Of course, the "delay" of the width of disturbance and/or embedding parameters is different in each applied system.

According to the chaotic short-term prediction method applied in the prediction section 2 of the monitoring apparatus according to the present invention, the strange attractor is reconstructed by embedding the timeseries data. By checking the shape and density of this attractor, it becomes possible to know the condition of the system. For example, in case of the blood pulse wave of a man is treated as timeseries data, the shape and density of the attractor is changed according to the mental state of the examined man. When the examined man is in poor health or has a mental illness, the shape of the attractor is different from that in a normal condition.

With this arranged monitoring apparatus according to the present invention, it becomes possible to set a normal range in response to the dynamic change of the timeseries data. As shown in FIG. 2, the normal range at the time (t-a+s) is largely different from the normal range at the time (t+s). That is, it shows that an optimum normal range can be set according to the condition of the observed system.

Further, the normal range for the prediction value may be changed according to the prediction value or the applied system. For example, the lower limit of the normal range is narrowed, the normal range may be changed according to a predetermined rule such that in case that the observed valued is larger than a predetermined value or smaller than a second predetermined value, the normal range is narrowed, and the normal range is broadened when the observed value is close to a prediction value.

Thus, the adjusting of the normal range according to the observed value is normally dependent on the rule of thumb.

It will be understood that such division of the range into a normal range and an abnormal range may be executed by using the Fuzzy theory. Although a conventional method is arranged to use AI, Fuzzy theory, such AI, Fuzzy theory requires an assumption of the tendency of the abnormal condition. In contrast, according to the present invention, the meaning of the Fuzzy rule becomes clear and simple.

Since the shape of the strange attractor is changed according to the disturbance of the system, it becomes easy to detect that the system is going to the abnormal condition by detecting a change of the strange attractor in a normal condition. Therefore, it is possible to execute a decision of the condition by monitoring the condition of the attractor.

Furthermore, since the prediction is executed by means of a chaotic short-term prediction method, it is possible to execute a high-accuracy short-term prediction and to obtain a high-accuracy prediction in response to the disturbance of the system.

The condition monitoring apparatus according to the present invention may be applied to the following uses.

(1) A system for detecting an abnormal phenomenon of chaotic timeseries data.

(2) A system for detecting an abnormal condition of a shaft vibration of a rotating machine such as a motor or generator.

(3) A system for detecting traffic backups.

(4) A system for detecting an abnormality of brain waves.

(5) A system for detecting an abnormal condition of a shaft vibration of a turbine.

(6) A system for detecting an abnormality of the stroke of a pulse.

(7) A system, for detecting an abnormality of the vibration of a water wheel or turbine.

What is claimed is:

1. A monitoring apparatus for monitoring an operating condition of a system, comprising:

a data storage section storing detected values of timeseries data from the system;

a predicting section generating a data vector having a parameter that is determined by the timeseries data of said data storage section, said predicting section obtaining a prediction value of the timeseries data of a predetermined time future by means of chaotic inference based on a behavior of an attractor which is generated in a reconstruction space by an embedding operation of the data vector;

a parameter optimizing section executing an optimizing operation of the parameter when a difference between the prediction value and an actually observed value becomes larger than a predetermined value; and a monitoring section comparing the detected value and the prediction value of the timeseries data, said monitoring section deciding a condition of the observed system according to the compared result.

2. A monitoring apparatus as claimed in claim 1, further comprising a displaying section which informs an abnormal condition of the system to a monitoring person according to a signal indicative of the abnormal condition of the system outputted from said monitoring section.

3. A monitoring apparatus as claimed in claim 1, wherein said data storage section includes a sensor for detecting the timeseries data as a value and a data input section for receiving the detected values.

4. A monitoring apparatus as claimed in claim 3, wherein said predicting section includes a timeseries data short-term predicting section which obtains a prediction value of the timeseries data according to the detected values and the parameter, and a data file section which stores the obtained prediction value.

5. A monitoring apparatus for informing an abnormal condition of a monitored system by utilizing chaotic inference, said monitoring apparatus comprising:

a data input section receiving timeseries data of the monitored system;

a timeseries data file receiving and storing the inputted timeseries data and a parameter associated with the timeseries data;

a parameter optimizing section receiving the timeseries data from said timeseries data file and executing an optimizing process of the parameter of the timeseries data;

a short-term predicting section receiving the timeseries data stored in said timeseries data file and the parameter optimized in said parameter optimizing section, said short-time predicting section obtaining a prediction value of the timeseries data in response to a prediction executing signal from said data input section;

a prediction value file receiving and storing the prediction value, the prediction value of said prediction value file being sent to said parameter optimizing section wherein the optimizing operation of the parameter is executed on the basis of the prediction value from said prediction value file and the input timeseries data from said data input section through said timeseries data file;

a prediction result extracting section extracting the prediction result from said prediction value file;

a condition monitoring section receiving the extracted prediction result from said prediction result extracting section, said condition monitoring section deciding as to whether the system is in a normal condition or abnormal condition, by comparing the prediction value and an actually detected value of the timeseries data; and a man-machine section receiving a signal indicative of the condition of the system from said condition monitoring section and displaying the condition of the system to alarm the abnormal condition of the system to a man relating to the system, wherein the predicting section reconstructs an n-dimension reconstruction condition space, and the prediction value is obtained by reconstructing the attractor to obtain a reconstructed attractor as a result.

6. A monitoring apparatus as claimed in claim 5, wherein the reconstructed attractor is obtained by embedding the timeseries data received during the normal condition of the system.

7. A monitoring apparatus for informing an abnormal condition of a monitored system by utilizing chaotic inference, said monitoring apparatus comprising:

a data input section receiving timeseries data of the monitored system;

a timeseries data file receiving and storing the inputted timeseries data and a parameter associated with the timeseries data;

a parameter optimizing section receiving the timeseries data from said timeseries data file and executing an optimizing process of the parameter of the timeseries data;

a short-term predicting section receiving the timeseries data stored in said timeseries data file and the parameter optimized in said parameter optimizing section, said short-time predicting section obtaining a prediction value of the timeseries data in response to a prediction executing signal from said data input section;

a prediction value file receiving and storing the prediction value, the prediction value of said prediction value file being sent to said parameter optimizing section wherein the optimizing operation of the parameter is executed on the basis of the prediction value from said prediction value file and the input timeseries data from said data input section through said timeseries data file;

a prediction result extracting section extracting the prediction result from said prediction value file;

a condition monitoring section receiving the extracted prediction result from said prediction result extracting section, said condition monitoring section deciding as to whether the system is in a normal condition or abnormal condition, by comparing the prediction value and an actually detected value of the timeseries data; and a man-machine section receiving a signal indicative of the condition of the system from said condition monitoring section and displaying the condition of the system to alarm the abnormal condition of the system to a man relating to the system, wherein the timeseries data is based on an attractor of the system, and wherein the short-term predicting section reconstructs an n-dimension reconstruction condition space, and the prediction value is obtained by reconstructing the attractor to obtain a reconstructed attractor as a result.

8. A monitoring apparatus as claimed in claim 7, wherein the reconstructed attractor is obtained by embedding the timeseries data received during the normal condition of the system.

9. A monitoring apparatus as claimed in claim 8, wherein the condition monitoring section determines that the normal condition exists when the prediction value is within a predetermined value with respect to the actually detected value of the timeseries data, and wherein the condition monitoring section determines that the abnormal condition exists otherwise.

10. A monitoring apparatus for informing an abnormal condition of a monitored system by utilizing chaotic inference, said monitoring apparatus comprising:

a data input section receiving timeseries data of the monitored system;

a timeseries data file receiving and storing the inputted timeseries data and a parameter associated with the timeseries data;

a parameter optimizing section receiving the timeseries data from said timeseries data file and executing an optimizing process of the parameter of the timeseries data;

a short-term predicting section receiving the timeseries data stored in said timeseries data file and the parameter optimized in said parameter optimizing section, said short-time predicting section obtaining a prediction value of the timeseries data in response to a prediction executing signal from said data input section;

a prediction value file receiving and storing the prediction value, the prediction value of said prediction value file being sent to said parameter optimizing section wherein the optimizing operation of the parameter is executed on the basis of the prediction value from said prediction value file and the input timeseries data from said data input section through said timeseries data file;

a prediction result extracting section extracting the prediction result from said prediction value file;

a condition monitoring section receiving the extracted prediction result from said prediction result extracting section, said condition monitoring section deciding as to whether the system is in a normal condition or abnormal condition, by comparing the prediction value and an actually detected value of the timeseries data; and a man-machine section receiving a signal indicative of the condition of the system from said condition monitoring section and displaying the condition of the system to alarm the abnormal condition of the system to a man relating to the system, wherein the condition monitoring section determines that the normal condition exists when the prediction value is within a predetermined value with respect to the actually detected value of the timeseries data, and wherein the condition monitoring section determines that the abnormal condition exists otherwise.

11. A monitoring method for informing an abnormal condition of a monitored system by utilizing chaotic inference, said monitoring method comprising the steps of:

receiving timeseries data of the monitored system;

storing the inputted timeseries data and a parameter associated with the timeseries data;

calculating a prediction value of the timeseries data based on the stored timeseries data and the optimized parameter, in response to a prediction executing signal;

storing the prediction value;

executing an optimizing process of the parameter of the timeseries data when a difference between the prediction value and an actually observed value becomes larger than a fixed value, wherein the stored prediction value is used in the optimizing process;

deciding as to whether the system is in a normal condition or abnormal condition by comparing the stored prediction value and an actually detected value of the timeseries data; and displaying the condition of the system to alarm the abnormal condition of the system to an operator.

* * * * *